US012769495B2

(12) United States Patent
Mizuma

(10) Patent No.: US 12,769,495 B2
(45) Date of Patent: Oct. 20, 2026

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Kenshiro Mizuma, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 38 days.

(21) Appl. No.: 18/797,820

(22) Filed: Aug. 8, 2024

(65) Prior Publication Data

US 2025/0077152 A1 Mar. 6, 2025

(30) Foreign Application Priority Data

Aug. 30, 2023 (JP) ................................ 2023-140255

(51) Int. Cl.
*G06F 3/14* (2006.01)
*G06F 3/04817* (2022.01)
(Continued)

(52) U.S. Cl.
CPC ............ *G06F 3/14* (2013.01); *G06F 3/04817* (2013.01); *H04N 23/62* (2023.01); *H04N 23/631* (2023.01); *H04N 23/633* (2023.01)

(58) Field of Classification Search
None
See application file for complete search history.

(56) References Cited

U.S. PATENT DOCUMENTS

2007/0126877 A1* 6/2007 Yang ...................... H04N 5/772 348/207.99
2012/0079406 A1 3/2012 Medhurst et al.
(Continued)

FOREIGN PATENT DOCUMENTS

JP 2009094585 A 4/2009
JP 2009164885 A 7/2009
(Continued)

OTHER PUBLICATIONS

The above patent documents were cited in the May 8, 2025 Japanese Office Action, which is enclosed without an English Translation, that issued in Japanese Patent Application No. 2023-140255.

*Primary Examiner* — Quan Pham
(74) *Attorney, Agent, or Firm* — Cowan, Liebowitz & Latman, P.C.

(57) ABSTRACT

An information processing apparatus comprises a thumbnail acquisition unit configured to acquire at least a thumbnail image which corresponds to preset information that includes one or more settings relating to a camera; a display control unit configured to, in a case where a plurality of thumbnail images has been acquired, control a display unit to display the plurality of thumbnail images on the display unit; wherein the preset information can include a first setting to change an angle of view of the camera, and the display control unit controls the display unit to display, on the display unit, first information relating to whether the first setting is included in the preset information together with the thumbnail image which corresponds to the preset information.

16 Claims, 10 Drawing Sheets

(51) Int. Cl.
*H04N 23/62* (2023.01)
*H04N 23/63* (2023.01)

(56) References Cited

U.S. PATENT DOCUMENTS

| | | | | |
|---|---|---|---|---|
| 2016/0227105 | A1* | 8/2016 | Kobayashi | G06F 3/04847 |
| 2019/0052797 | A1* | 2/2019 | Taoki | G08B 13/19682 |

FOREIGN PATENT DOCUMENTS

| | | | | |
|---|---|---|---|---|
| JP | 2013198136 | A | | 9/2013 |
| JP | 2019087974 | A | | 6/2019 |
| JP | 2020202481 | A | * | 12/2020 |
| WO | 2017119034 | A | | 7/2017 |

* cited by examiner

INFORMATION PROCESSING APPARATUS, INFORMATION PROCESSING METHOD, AND STORAGE MEDIUM

BACKGROUND OF THE INVENTION

Field of the Invention

The present invention relates to an information processing apparatus, an information processing method, a storage medium, and the like.

Description of the Related Art

Conventionally, there is a function referred to as a preset in which it is possible to register specific pan-tilt-zoom (PTZ) positions and image quality settings for a remote camera in the body of the remote camera, and to readout and execute the contents that have been registered.

This function makes it possible for the user of the remote camera to easily switch between PTZ positions and image quality settings that have been registered in advance. In addition, it is possible to register a plurality of presets for PTZ positions and image quality settings. In addition, there is also a function referred to as a preset thumbnail display for increasing the identifiability of different presets.

A preset thumbnail display is a function in which an image that was image captured by a camera at the time that a preset was registered is stored in this camera, this image is acquired via a network on a control apparatus such as a web UI, a controller application, or the like, and is displayed as a thumbnail.

In the above-described presets, it is also possible to register just the image quality settings, without registering a PTZ position. However, in the prior-art technology that is disclosed in, for example, Japanese Unexamined Patent Application, First Publication No. 2013-198136, a user is not able to determine whether or not there is a PTZ position registered in a preset by just looking at the thumbnail image for the preset.

Therefore, there is the problem that the user will not be able to determine whether this a is a preset for which the PTZ position will move to the angle of view that is shown in the thumbnail image or if this is a preset in which the PTZ position will not move to the angle of view that is shown in the thumbnail image after the preset has been executed.

SUMMARY OF THE INVENTION

The information processing apparatus of one of aspects of the present invention comprises at least one processor or circuit configured to function as:

- a thumbnail acquisition unit configured to acquire at least a thumbnail image which corresponds to preset information that includes one or more settings relating to a camera; and
- a display control unit configured to, in a case where a plurality of thumbnail images has been acquired, control a display unit to display the plurality of thumbnail images on the display unit;
- wherein the preset information can include a first setting to change an angle of view of the camera, and the display control unit controls the display unit to display, on the display unit, first information relating to whether the first setting is included in the preset information together with the thumbnail image which corresponds to the preset information.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate descriptions will be omitted or simplified.

First Embodiment

Figure 1:
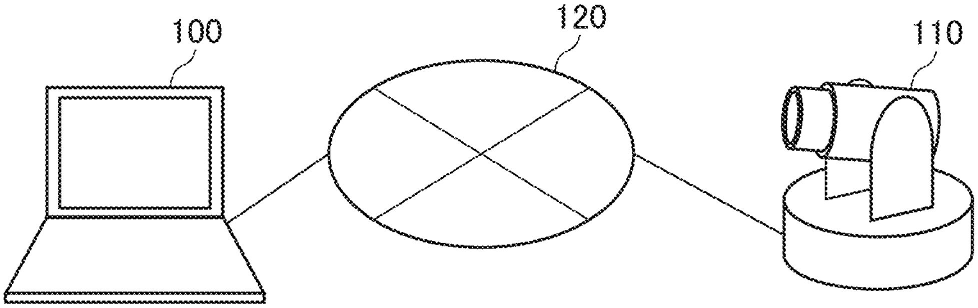
FIG. 1 is a diagram showing an example of a system configuration of the First Embodiment.

FIG. 1 is a diagram showing an example of a system configuration of the First Embodiment. The system according to the First Embodiment has an information processing apparatus 100, an image capturing apparatus 110, and a network 120. The information processing apparatus 100 and the image capturing apparatus 110 are connected to each other via the network 120.

The network 120 is realized by, for example, a plurality of routers, switches, cables, or the like that conform to a communication standard such as Ethernet (registered trademark), or the like. Note that the network 120 may also be realized by the internet, a wired LAN (Local Area Network), a wireless LAN, a WAN (Wide Area Network), or the like.

Figure 2A:
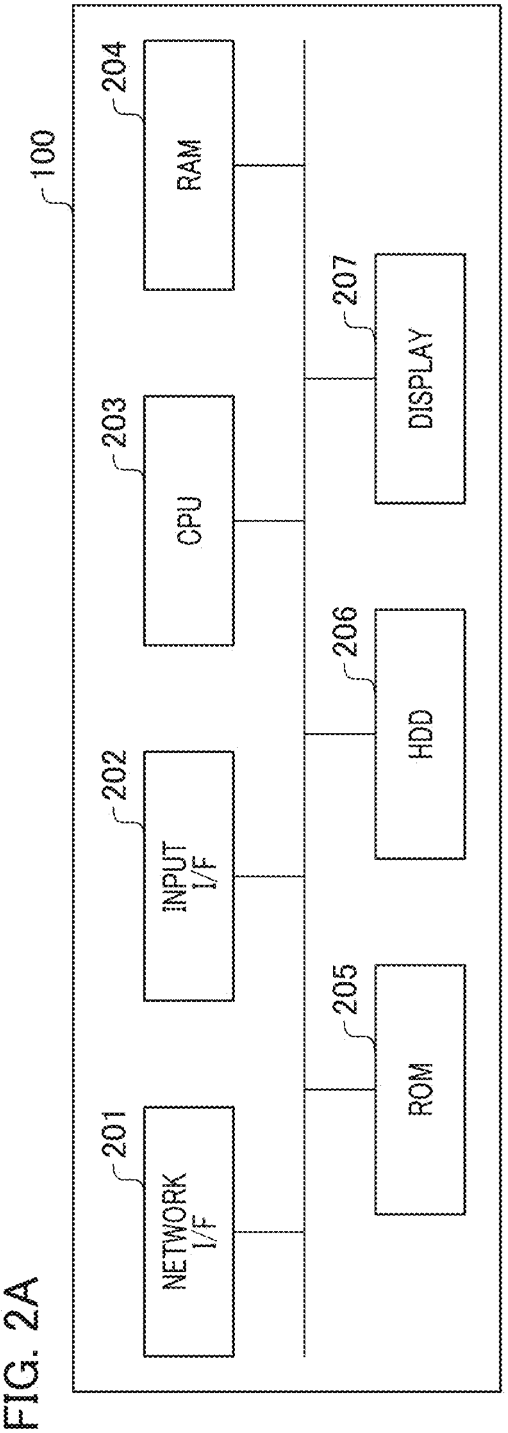
FIGS. 2A, and 2B are diagrams showing examples of hardware configurations of an information processing apparatus 100, and an image capturing apparatus 110 of the First Embodiment.

Next, FIG. 2A is a diagram showing an example of a hardware configuration of the information processing apparatus 100 of the First Embodiment.

A network I/F (Interface) 201 performs communications with external apparatuses in accordance with TCP/IP, HTTP, or the like via the network 120. An input I/F 202 receives commands from an input apparatus such as a mouse, a keyboard, or the like via a USB, or the like. A CPU (Central Processing Unit) 203 is a central processing apparatus that integrally controls the information processing apparatus 100.

A RAM 204 (Random Access Memory) temporarily stores a computer program that is executed by the CPU 203. In addition, the RAM 204 provides a work area that is used when the CPU 203 executes processing In addition, the RAM 204 can also function as, for example, a frame memory, or it can also function as a buffer memory. A ROM (Read Only Memory) 205 stores a program for the CPU 203 to control the information processing apparatus 100, or the like. An HDD 206 is a storage apparatus that records image data, or the like A display 207 is configured by an LCD (Liquid Crystal Display) or the like, and displays images that have been transmitted from the image capturing apparatus 110, a user interface (UI) window to be described below, and the like.

Note that in the First Embodiment, although an explanation is given of an example in which the information processing apparatus 100 is provided with the display 207, the present invention is not limited thereto, and the information processing apparatus 100 and the display 207 may also both have separate housings.

In this case, the information processing apparatus 100 and the display 207 are connected via a cable such as an HDMI (High-Definition Multimedia Interface) (registered trademark), an SDI (Serial Digital Interface), or the like.

Figure 2B:
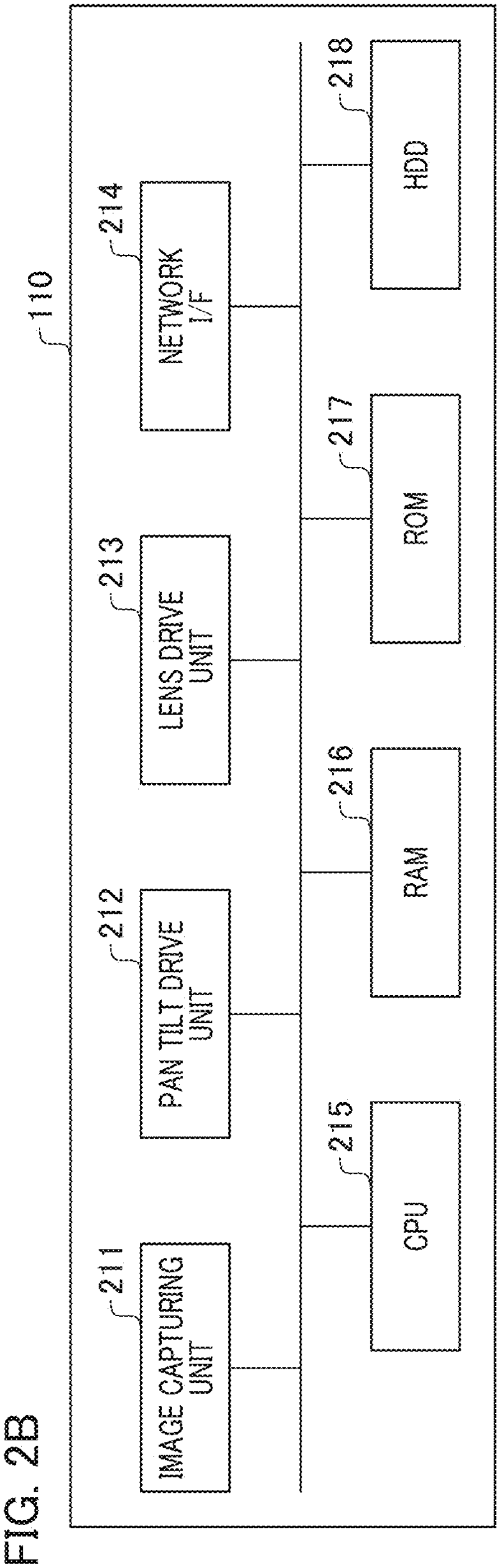

Next, FIG. 2B is a diagram showing an example of a hardware configuration of the image capturing apparatus 110 of the First Embodiment.

An image capturing unit 211 captures images. Specifically, the image capturing unit 211 has an image capturing element such as a CCD (Charge Couple Device) sensor, a CMOS (Complementary Metal Oxide Semiconductor) sensor, or the like, and generates an electric signal by photoelectrically converting a subject image that has been formed through a lens of the image capturing apparatus 110. In addition, the image capturing unit 211 generates an image via processing to convert the electric signal that has been photoelectrically converted to a predetermined digital signal.

A pan tilt drive unit 212 is configured by a mechanical drive system that is able to perform pan direction operations and tilt direction operations for the image capturing apparatus 110, and a drive source motor. A lens drive unit 213 is configured by a drive system for a focus lens and a zoom lens, and is able to control the zoom and the focus of the image capturing apparatus 110. In addition, a network I/F 214 performs communications with external apparatuses in accordance with TCP/IP, HTTP, or the like via the network 120.

A CPU 215 is a central processing apparatus that integrally controls the image capturing apparatus 110. A RAM 216 temporarily stores a computer program that is executed by the CPU 215. In addition, the RAM 216 provides a work area that is used when the CPU 215 is executing processing.

In addition, for example, the RAM 216 can function as a frame memory, and it can also function as a buffer memory. A ROM 217 stores a program for the CPU 215 to control the image capturing apparatus 110, or the like. An HDD 218 is a storage apparatus that records image data or the like.

Figure 3:
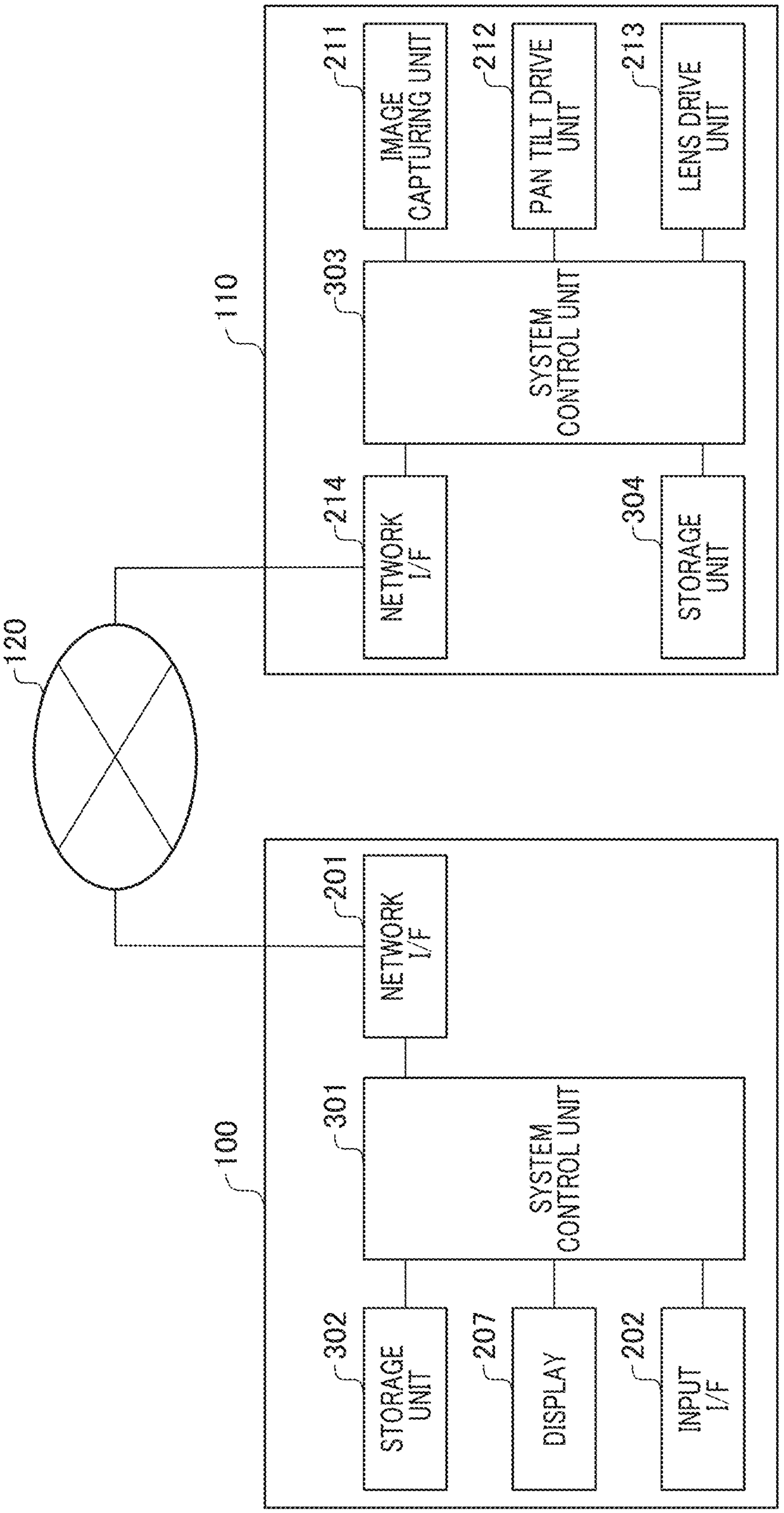
FIG. 3 is a diagram showing an example of functional blocks of the information processing apparatus 100, and the image capturing apparatus 110 of the First Embodiment.

Next, FIG. 3 is a diagram showing an example of functional blocks for the information processing apparatus 100 and the image capturing apparatus 110 of the First Embodiment. Note that each function of the system control unit 301 and a storage unit 302 of the information processing apparatus 100 that are shown in FIG. 3 are realized by, for example, the CPU 203 executing a computer program that has been stored on the ROM 205 of the information processing apparatus 100.

First, the functions of the information processing apparatus 100 will be explained. The system control unit 301 of the information processing apparatus 100 controls the entirety of the information processing apparatus 100. In addition, the system control unit 301 generates control commands, which are commands for controlling the pan-tilt-zoom, autofocus, and the like of the image capturing apparatus 110, and transmits these to the image capturing apparatus 110 via the network I/F 201 according to user operations via the input I/F 202.

In addition, the system control unit 301 acquires an image that has been transmitted from the image capturing apparatus 110 and an image that has been transmitted from the network I/F 201 and displays these images on the display 207. The storage unit 302 stores registration information for presets, which will be explained below, and thumbnail images.

Figure 4:
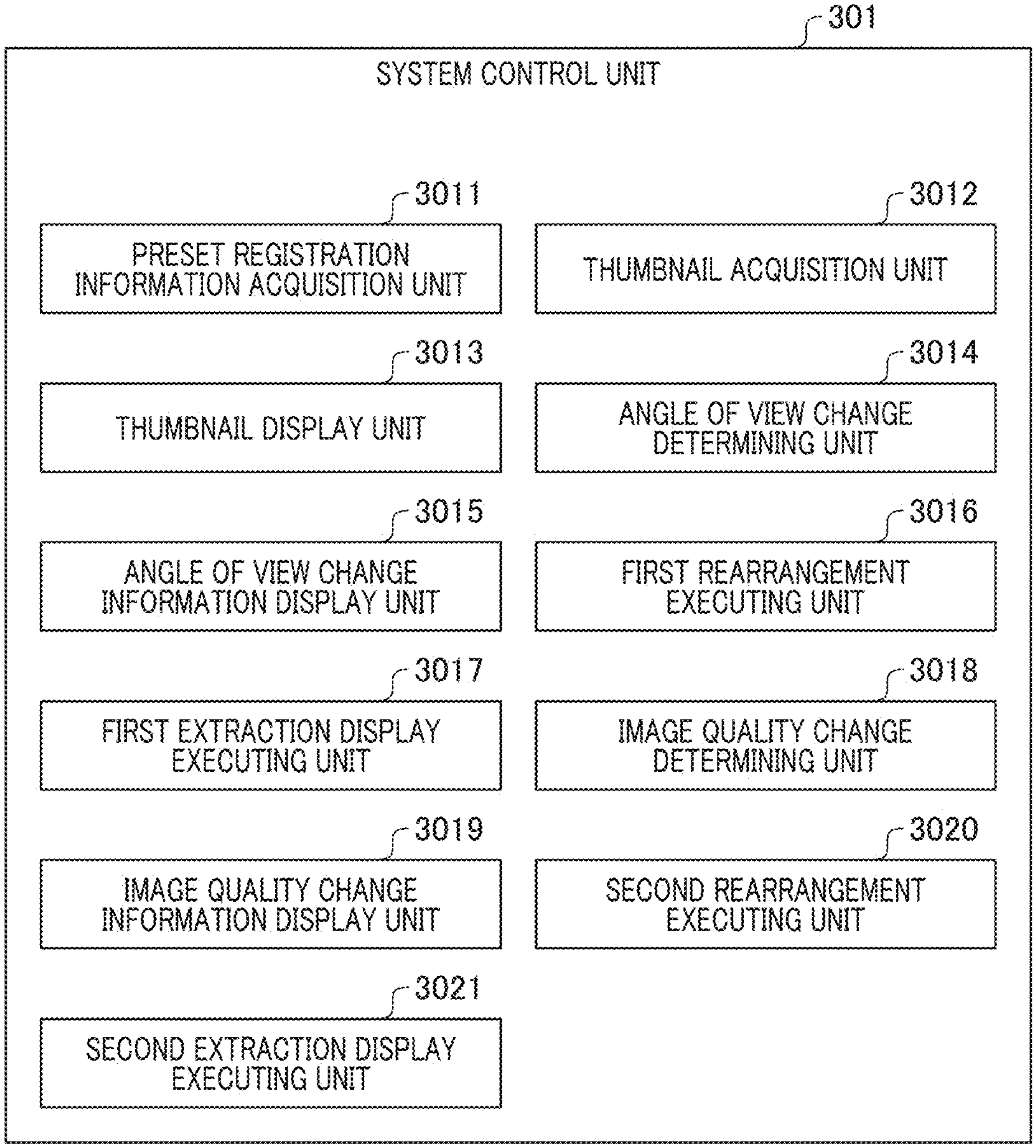
FIG. 4 is a diagram showing a functional configurational example of a system control unit 301 that is included in the information processing apparatus 100 of the First Embodiment.

FIG. 4 is a diagram showing a functional configurational example of the system control unit 301 that is included in the information processing apparatus 100 of the First Embodiment. As is shown in FIG. 4, the system control unit 301 is provided with a preset registration information acquisition unit 3011, a thumbnail acquisition unit 3012, a thumbnail display unit 3013, an angle of view change determining unit 3014, and an angle of view change information display unit 3015.

The preset registration information acquisition unit 3011 acquires preset registration information, which is information that is registered in relation to the presets for the camera, from the camera. The thumbnail acquisition unit 3012 acquires preset thumbnail images, which are images corresponding to the presets.

That is, this preset is executed, and an image of a region that is captured by the execution of this preset is acquired to serve as a preset thumbnail image. Note that the preset thumbnail image does not necessarily need to be an image that has been captured at the time when the preset was registered.

It is sufficient if this is at least an image corresponding to this preset. For example, this may also be a map image, an icon image, or the like that shows the position that is image captured by the preset. The thumbnail display unit 3013 displays the preset thumbnail image.

The angle of view change determining unit 3014 determines if a setting value that will change the angle of view is included in the preset registration information. The angle of view change information display unit 3015 displays information corresponding the results that have been determined by the angle of view change determining unit 3014. Note that the camera is, for example, the image capturing apparatus 110.

In addition, the angle of view change information display unit 3015 may also make the thumbnail display unit 3013 display information showing that a setting value that will change the angle of view is included in the preset registration information. In addition, the angle of view change information display unit 3015 may also make the thumbnail display unit 3013 display information showing that a setting value that will change the angle of view is not included in the preset registration information.

In addition, as is shown in FIG. 4, the system control unit 301 is provided with a first rearrangement executing unit 3016, and a first extraction display executing unit 3017. The first rearrangement executing unit 3016 extracts presets that include settings values that will change the angle of view from among a plurality of presets, and executes a rearrangement such that the presets that have been extracted are prioritized in the display.

The first extraction display executing unit 3017 extracts only presets that include a setting value that will change the angle of view from among the plurality of presets and displays only the presets that have been extracted.

Furthermore, as is shown in FIG. 4, the system control unit 301 is provided with an image quality change determining unit 3018, an image quality change information display unit 3019, a second rearrangement executing unit 3020, and a second extraction display executing unit 3021.

The image quality change determining unit 3018 determines if a setting value that will change the image quality of a still image or a movie image that is captured by the camera is included in the preset registration information. The image quality change information display unit 3019 displays information corresponding to results that have been determined by the image quality change determining unit 3018.

In addition, the image quality change information display unit 3019 may also make the thumbnail display unit 3013 display information showing that a setting value that will change the image quality is included in the preset registration information. In addition, the image quality change information display unit 3019 may also make the thumbnail display unit 3013 display information that shows that a setting value that will change the image quality is not included in the preset registration information.

The second rearrangement executing unit 3020 extracts presets that include settings values that will change the image quality from among the plurality of presets, and executes rearrangement such that presets that have been extracted are prioritized in the display.

The second extraction display executing unit 3021 performs extraction in which it extracts only presets that include a setting value that will change the image quality from among the plurality of presets and displays only the presets that have been extracted.

Note that a specific example of the processing that is executed by the system control unit 301 will be explained below.

The functions of the image capturing apparatus 110 will be explained. Note that each function of a system control unit 303 and a storage unit 304 of the image capturing apparatus 110 that is shown in FIG. 3 are realized by, for example, the CPU 215 executing a computer program that has been stored on the ROM 217 of the image capturing apparatus 110.

The system control unit 303 analyzes a control command that has been received from the information processing system 100, and performs processing according to the control command. For example, in a case in which a control command for image quality adjustment has been received, the system control unit 303 performs control on the image capturing unit 211 to adjust the image quality. Note that the image quality settings include settings for exposure, white balance, noise reduction, blur correction, sharpness, and the like.

In addition, in a case in which a control command to control the pan/tilt has been received, the system control unit 303 executes control for the pan and tilt of the image capturing apparatus 110 by controlling the pan tilt drive unit 212. In addition, in a case in which a control command to control the zoom and a control command to control the focus have been received, the system control unit 303 executes control for the zoom and focus of the image capturing apparatus 110 by controlling the lens drive unit 213.

In addition, in a case in which the system control unit 303 has received a preset registration command, the system control unit 303 stores an image that was captured when the current pant tilt zoom position, the image quality settings, and the preset registration command were received to serve as the thumbnail in the storage unit 304.

Note that it is possible that whether or not to register either of the pan-tilt-zoom and the image quality settings is indicated in the preset registration command. In addition, in a case in which a preset execution command has been received, the system control unit 303 executes the following processing.

In this case, the system control unit 303 reads out preset information that is stored in the storage unit 304, reads out the value for the pan-tilt-zoom and the image quality settings that have been registered, controls the image capturing unit 211 and the pan tilt drive unit 212, and applies the settings values that have been stored in the preset.

In addition, in a case in which an image acquisition command has been received, the system control unit 303 acquires image data that has been generated by the image capturing unit 211 and transmits this image data to the information processing apparatus 100 via the network I/F 214.

In addition, in a case in which a thumbnail image acquisition command has been received, the system control unit 303 acquires thumbnail image data that is stored in the storage unit 304, and transmits this image data to the information processing apparatus 100 via the network I/F 214.

In addition, in a case in which a preset information acquisition command has been received, the system control unit 303 acquires preset information that is stored on the storage unit 304, and transmits this preset information to the information processing apparatus 100 via the network I/F 214. The storage unit 304 stores the preset information and the preset thumbnail image.

Note that in the First Embodiment, it is made such that 100 types of presets can be stored. In addition, in the First Embodiment, each preset is named, for example, preset #1, preset #2, and the like.

Figure 5:
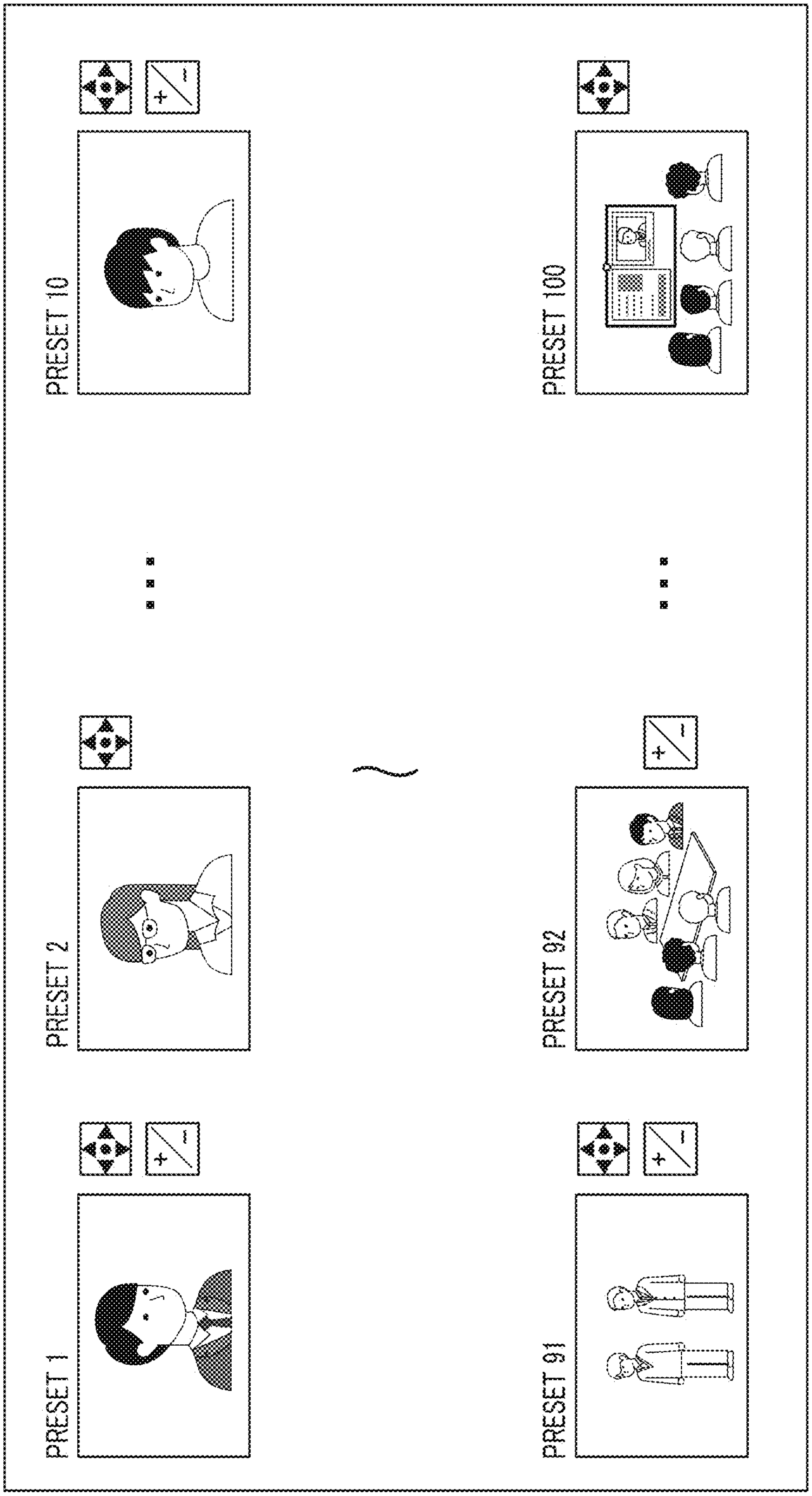
FIG. 5 is a diagram for explaining an example of a GUI that displays a thumbnail on the information processing apparatus 100 of the First Embodiment.

Next, the thumbnail display function in the First Embodiment will be explained while referring to FIG. 5 and FIG. 6. FIG. 5 and FIG. 6 are diagrams explaining examples of a GUI (Graphical User Interface) that displays a thumbnail on the information processing apparatus 100 of the First Embodiment.

FIG. 5 shows one example of a GUI is that is displayed on the display 207 by the system control unit 301 of the information processing apparatus 100 of the First Embodiment. FIG. 5 is one example of a GUI that displays a list of thumbnails from the preset #1 to the preset #100.

Note that FIG. 4 does not actually show 100 thumbnails, and the depiction of a portion of the thumbnails has been omitted. As is shown in FIG. 5, it is possible to display a list of the thumbnail images for the presets that have been acquired from the image capturing apparatus 110 on the information processing apparatus 100.

Figure 6A:
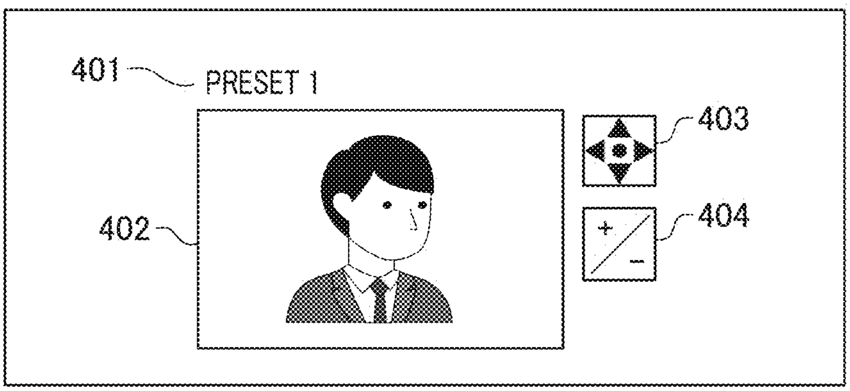
FIGS. 6A to C are diagrams for explaining examples of GUIs that display thumbnails on the information processing apparatus 100 of the First Embodiment.
Figure 6B:
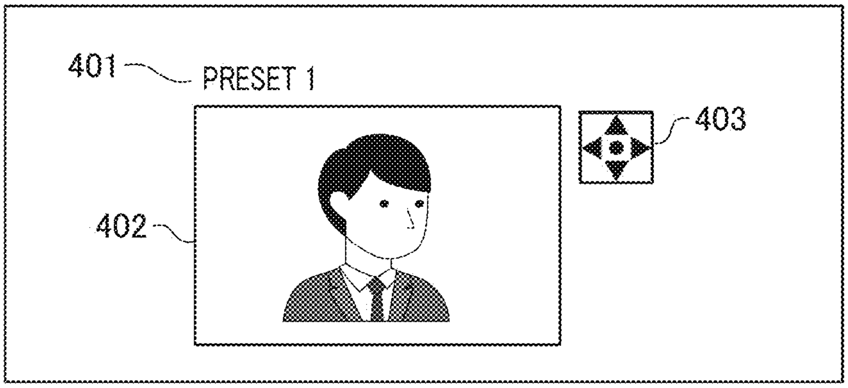
Figure 6C:
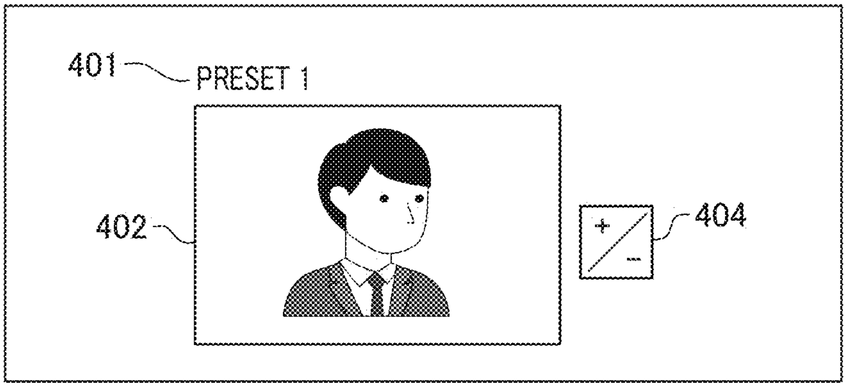

FIG. 6A, FIG. 6B, and FIG. 6C have extracted just the display of the preset #1 from the GUI that is shown in FIG.

5. The preset number 401, the thumbnail image 402, the pan-tilt-zoom icon 403, and the image quality settings icon 404 that are shown in FIG. 6A, FIG. 6B, and FIG. 6C will be explained.

The preset number 401 shows a number for a preset. The thumbnail image 402 is a thumbnail image for a preset that has been acquired from the image capturing apparatus 110. The pan-tilt-zoom icon 403 is an icon that shows whether or not pan-tilt-zoom has been registered in the preset. Note that, although the image capturing apparatus 110 has the pan-tilt-zoom functions in this embodiment, at least one of pan, tilt, and zoom functions may be installed in the image capturing apparatus 110, in that case, the icon 403 is an icon that shows whether or not at least one of pan, tilt, and zoom has been registered in the preset.

In a case in which pan-tilt-zoom has been registered in the preset, the pan-tilt-zoom icon 403 is displayed as is shown in FIG. 6A and FIG. 6B. In a case in which pan-tilt-zoom has not been registered in the preset, the icon is not displayed, as is shown in FIG. 6C.

In this manner, it is possible for the user to determine whether or not pan-tilt-zoom has been registered in a preset by the display state of the pan-tilt-zoom icon 403. The image quality settings icon 404 is an icon that shows if image quality settings have been registered in the preset. In a case in which image quality settings have been registered, the image quality settings icon 404 is displayed as is shown in FIG. 6A and FIG. 6C.

In a case in which image quality settings have not been registered, the image quality settings icon 404 is not displayed, as is shown in FIG. 6B. In this manner, it is possible for a user to determine whether or not image quality settings have been registered in a preset by the display state of the image quality settings icon 404. Note that it may also be made such that the pan-tilt-zoom icon 403 and the image quality settings icon 404 are displayed as being superimposed on the thumbnail image 402.

Figure 7:
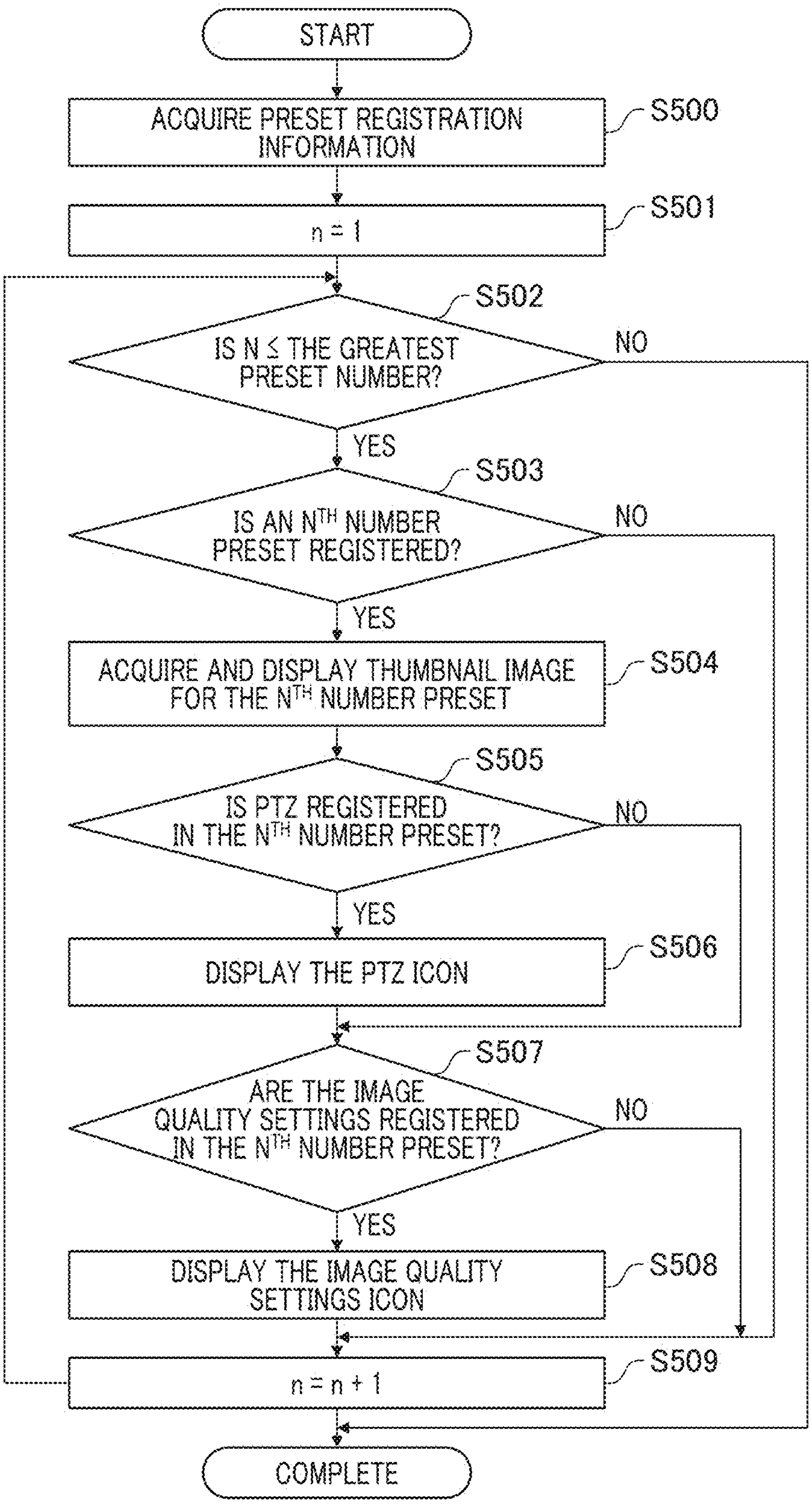
FIG. 7 is a flowchart showing an example of a processing flow for displaying thumbnails on the information processing apparatus 100 in the First Embodiment.

Next, FIG. 7 is a flowchart showing an example of a processing flow for displaying a thumbnail on the information processing apparatus 100 of the First Embodiment. Note that the processing that is shown in FIG. 7 is realized by the CPU 203 of the information processing apparatus 100 executing a computer program that has been stored on the ROM 205 of the information processing apparatus 100.

During step S500, the system control unit 301 transmits a preset information acquisition command to the image capturing apparatus 110 and acquires the preset registration information. Note that the preset registration information includes information relating the presence or absence of registration for presets with respect to each preset from preset #1 to preset #100, information relating to the presence or absence of pan-tilt-zoom registration, and information relating to the presence or absence of image quality settings information.

During step S501, the system control unit 301 prepares a variable n and inserts 1 into the variable n.

During step S502, the system control unit 301 determines whether or not the variable n is less than the largest preset number. In a case in which the system control unit 301 has determined that the variable n is less than the largest preset number, the processing proceeds to step S503.

Note that the processing for step S502 to step S508 is loop processing. In contrast, in a case in which during S502, the system control unit 301 has determined that the variable n is not less than the largest preset number, the loop is completed, and the processing that is shown in FIG. 7 is completed. Note that in the First Embodiment, the presets go up until number 100, and therefore, the largest preset number is 100.

During step S503, the system control unit 301 determines whether or not an $n^{th}$ number preset is registered. In a case in which the system control unit 301 has determined that an $n^{th}$ number preset has been registered, the processing proceeds to step S504. In contrast, in a case in which it has been determined that an $n^{th}$ number preset has not been registered, the processing proceeds to step S509.

During step S504, the system control unit 301 transmits a thumbnail image acquisition command for the $n^{th}$ number preset to the image capturing apparatus 110, acquires the thumbnail image, and displays this on the GUI for the thumbnail display.

During step S505, the system control unit 301 determines whether or not the pan-tilt-zoom position has been registered in the $n^{th}$ number preset. In a case in which the system control unit 301 has determined that the pan-tilt-zoom position has been registered, the processing proceeds to step S506. In contrast, in a case in which the system control unit 301 has determined that the pan-tilt-zoom position has not been registered, the processing proceeds to step S507.

During step S506, the system control unit 301 displays the pan-tilt-zoom icon 403 on the GUI for the thumbnail display.

During step S507, the system control unit 301 determines whether or not the image quality settings have been registered for the $n^{th}$ number preset. In a case in which the system control unit 301 has determined that the image quality settings have been registered, the processing proceeds to step S508. In contrast, in a case in which it has been determined that the image quality settings have not been registered, the processing proceeds to step S509.

During step S508, the system control unit 301 displays the image quality settings icon 404 on the GUI for the thumbnail display.

During step S509, the system control unit 301 inserts a value in which 1 has been added to the variable n as the variable n.

Next, the processing returns to step S502, which is the start of the loop, and the system control unit 301 determines if the variable n is less than the largest preset number in the manner that was described above. In addition, in a case in which the variable n is less than the largest preset number, the system control unit 301 makes the loop continue, and in a case in which the variable n is not less than the largest preset number, the processing that has been shown in FIG. 7 is completed.

As has been shown above, by executing the processing that is shown in FIG. 7, it is possible to execute the display of a thumbnail for each preset, as well as the display of a pan-tilt-zoom icon and an image settings icon. In this manner, it becomes possible for a user to differentiate whether or not the pan-tilt-zoom and the image quality settings have been registered in a preset by just looking at the thumbnail display.

Note that with respect to the GUI that displays the plurality of preset thumbnails as a list on the same screen that was shown in FIG. 5, this may also be a function in which it is possible to extract and display only presets for which one of the pan-tilt-zoom position, or the image quality settings are registered.

Next, the function for extracting and displaying only presets for which the pan-tilt-zoom or the image quality settings are registered and the function for rearranging the display order based on whether or not the pan-tilt-zoom or the image quality settings are registered will be explained with reference to FIG. 8. FIG. 8 is a diagram for explaining one example of a GUI that changes the display of a thumbnail list on the information processing apparatus 100 of the First Embodiment.

Figure 8A:
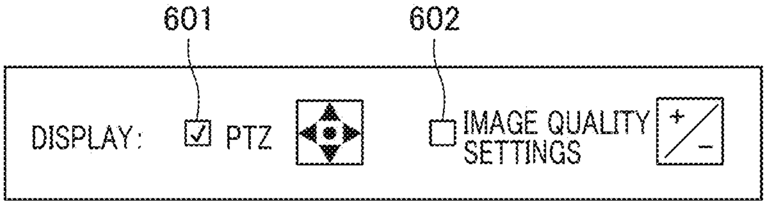
FIGS. 8A, and B are diagrams for explaining an example of a GUI that changes a display of a list of thumbnails on the information processing apparatus 100 of the First Embodiment.

The GUI that is shown in FIG. 8A is a GUI for executing extraction. The check box 601 is a check box for selecting whether or not to extract a preset for which the pan-tilt-zoom position has been registered.

In a case in which the check box 602 has been checked off, the presets for which the pan-tilt-zoom position has been registered are extracted and displayed. In contrast, in a case in which the check box 601 has not been checked off, the presets for which the pan-tilt-zoom position is not registered are not displayed.

The check box 602 is a check box for selecting whether or not to extract the presets for which the image quality settings have been recorded. In a case in which the check box 602 has been checked off, the presets for which the image quality settings have been registered are extracted and displayed.

In contrast, in a case in which the check box 602 has not been checked off, the presets for which the image quality settings have not been registered are not displayed. It is thereby possible for the information processing apparatus 100 to extract and display just the presets on which the user would like to focus.

Figure 8B:
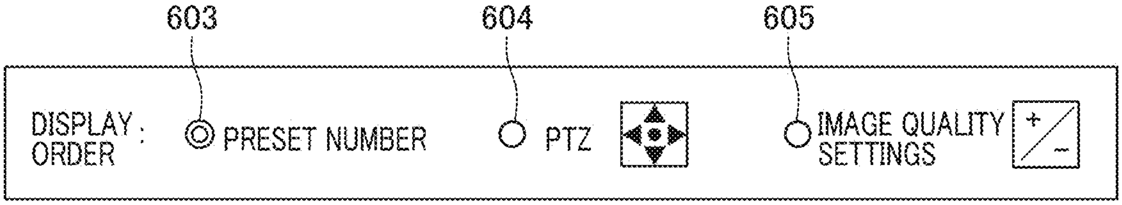

The GUI that has been shown in FIG. 8B is a GUI for executing rearrangement. The select button 603 is a button for determining the display order based on the preset number. In a case in which the select button 603 has been selected, display is performed starting the with the presets having smaller preset numbers.

The select button 604 is a button for deciding the display order based on whether or not the pan-tilt-zoom position has been registered. In a case in which the select button 604 has been selected, display is performed starting with the presets for which the pan-tilt-zoom position has been registered.

The select button 605 is a button for deciding the display order based on whether or not the image quality settings have been registered. In a case in which the select button 605 has been selected, display is performed starting with the presets for which the image quality settings have been registered. It is thereby possible to perform display starting with the presets on which the user would like to focus.

Second Embodiment

In the First Embodiment, processing was explained in which the registration of the pan-tilt-zoom or the image quality settings was displayed using an icon. In contrast, in the Second Embodiment, processing will be explained in which an icon is used to display that the pan-tilt-zoom has not been registered.

Below, the processing for the information processing apparatus 100 according to the Second Embodiment will be explained with reference to FIG. 9, and FIG. 10. Note that in the Second Embodiment, an explanation will primarily be given with respect to the portions that are different than those in the First Embodiment, while the configurational elements and processing that are identical or equivalent to those in the First Embodiment will be assigned the same reference numerals, and explanations relating to contents that overlap with the First Embodiment will be omitted.

Figure 9:
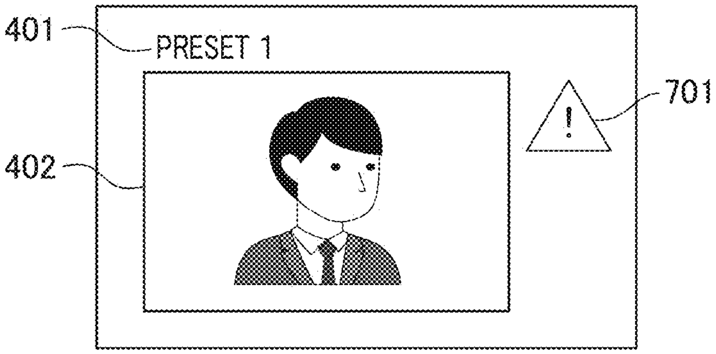
FIG. 9 is a diagram for explaining an example of a GUI that displays thumbnails on the information processing apparatus 100 of the Second Embodiment.

FIG. 9 is a diagram for explaining an example of a GUI that displays a thumbnail on the information processing apparatus 100 of the Second Embodiment. FIG. 9 extracts and shows just the display of the preset number 1 from among the GUIs for the thumbnail display function in the Second Embodiment.

The warning icon 701 is an icon that shows that any of the pan-tilt-zoom position has not been registered in a preset. In a case in which any of the pan-tilt-zoom position has not been registered in a preset, the warning icon 701 that was shown in FIG. 9 is displayed.

In contrast, in a case in which at least one of the pan-tilt-zoom position is registered, the icon is not displayed. In this manner, it is possible for a user to determine whether or not the pan-tilt-zoom position is registered in a preset from the display state of the warning icon 701.

Figure 10:
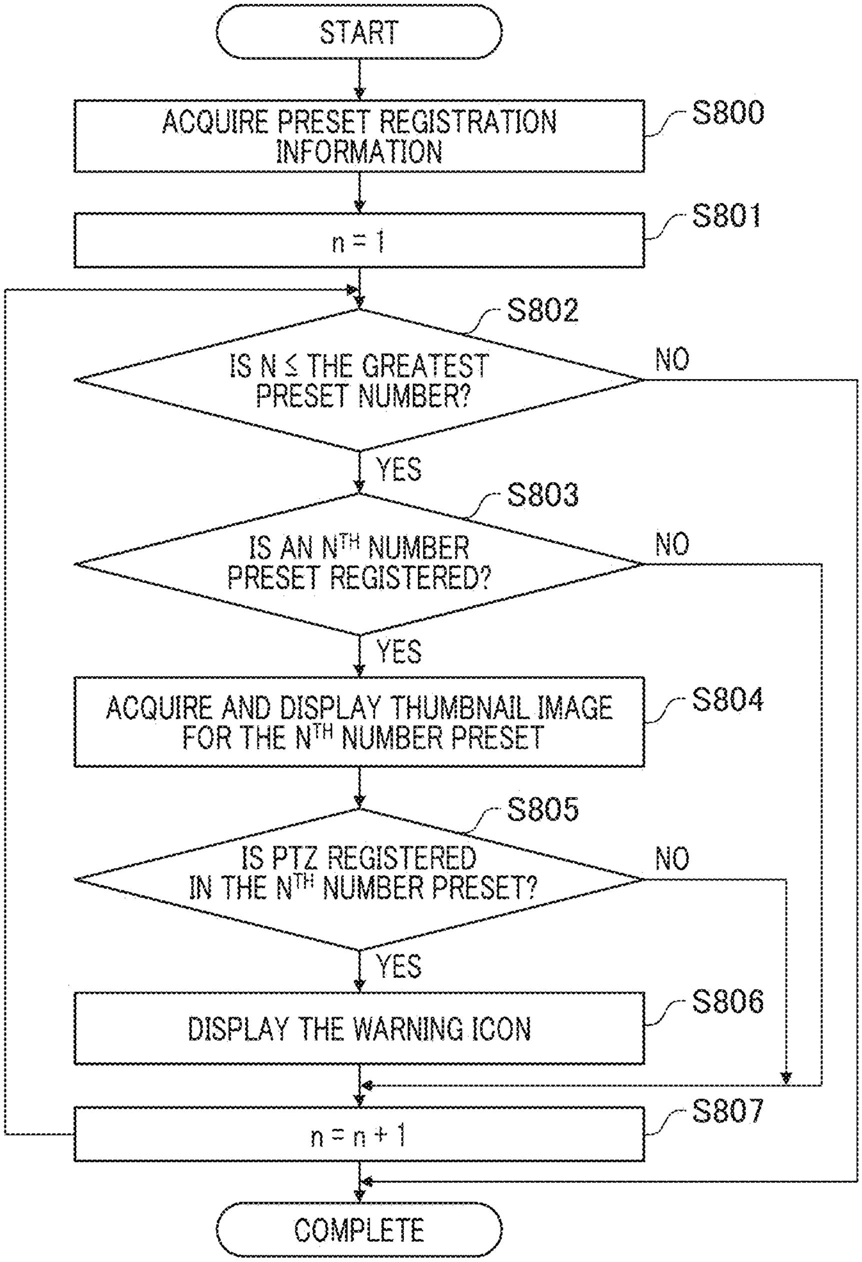
FIG. 10 is a flowchart for showing an example of a processing flow for displaying a thumbnail on the information processing apparatus 100 of the Second Embodiment.

Next, FIG. 10 is a flowchart showing an example of a processing flow for displaying a thumbnail on the information processing apparatus 100 of the Second Embodiment.

Note that the processing that is shown in FIG. 10 is realized by the CPU 203 of the information processing apparatus 100 executing a computer program that has been stored on the ROM 205 of the information processing apparatus 100.

During step S800, the system control unit 301 transmits a preset information acquisition command to the image capturing apparatus 110, and acquires preset registration information. Note that the preset registration information includes information relating to whether or not the preset number 1 to the preset number 100 have been registered, information relating to whether or not the pan-tilt-zoom position has been registered, and information relating to whether or not the image quality settings have been registered.

During step S801, the system control unit 301 prepares a variable n, and inserts 1 into the variable n.

During step S802, the system control unit 301 determines whether or not the variable n is less than the largest preset number. In a case in which the system control unit 301 has determined that the variable n is less than the largest preset number, the processing proceeds to step S803. Note that the processing from step S802 to step S806 is loop processing.

In a case in which during step S802, the system control unit 301 has determined that the variable n is not smaller than the largest preset number, the loop is completed, and the processing that is shown in FIG. 10 is completed. In addition, in the present embodiment, the presets go up to a preset number 100, and therefore the largest preset number becomes 100.

During step S803, the system control unit 301 determines whether or not an $n^{th}$ number preset has been registered. In a case in which the system control unit 301 has determined that an $n^{th}$ number preset has been registered, the processing proceeds to step S804. In contrast, in a case in which the system control unit 301 has determined that a preset for the $n^{th}$ number has not been registered, the processing proceeds to step S807.

During step S804, the system control unit 301 transmits a thumbnail image acquisition command for the $n^{th}$ number preset to the image capturing apparatus 110, acquires a thumbnail image, and displays this on the GUI for thumbnail display.

During step S805, the system control unit 301 determines whether or not the pan-tilt-zoom position has been registered in the $n^{th}$ number preset. In a case in which the system control unit 301 has determined that a pan-tilt-zoom position has not been registered, the processing proceeds to step S806. In contrast, in a case in which the system control unit 301 has determined that a pan-tilt-zoom position has been registered, the processing proceeds to step S807.

During step S806, the system control unit 301 displays the warning icon 701 on the GUI for thumbnail display.

During step S807 the system control unit 301 inserts a value in which 1 has been added to the variable n as the variable n.

Next, the processing returns to step S802, which is the start of the loop, and the system control unit 301 determines whether or not the variable n is smaller than the largest preset number, as was explained above. In addition, in a case in which the variable n is smaller than the largest preset number, the system control unit 301 continues the loop, and in a case in which the integer n is not smaller than the largest preset number, the processing that was shown in FIG. 10 is completed.

In the manner that has been explained above, by executing the processing that is shown in FIG. 10, it is possible to perform the display of a thumbnail and the display of the warning icon for each preset. It thereby becomes possible for the user to distinguish information relating to the registration of a preset by just looking at the thumbnail display.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions. For example, although the image capturing apparatus 110 has the pan-tilt-zoom functions in the embodiment, at least one of pan, tilt, and zoom functions may be installed in the image capturing apparatus 110. In that case, at least one of pan, tilt, and zoom functions corresponds to a first setting to change an angle of view of the camera corresponds to.

In addition, as a part or the whole of the control according to the embodiments, a computer program realizing the function of the embodiments described above may be supplied to the information processing apparatus or the like through a network or various storage media. Then, a computer (or a CPU, an MPU, or the like) of the information processing apparatus or the like may be configured to read and execute the program. In such a case, the program and the storage medium storing the program configure the present invention.

In addition, the present invention includes those realized using at least one processor or circuit configured to perform functions of the embodiments explained above. For example, a plurality of processors may be used for distribution processing to perform functions of the embodiments explained above.

This application claims the benefit of priority from Japanese Patent Application No. 2023-140255, filed on Aug. 30, 2023, which is hereby incorporated by reference herein in its entirety.

What is claimed is:

1. An information processing apparatus comprising:
at least one memory; and
at least one processor or circuit configured to:
acquire preset information including information that identifies a preset of a camera;
acquire at least a thumbnail image which corresponds to the preset; and
control a display device to display a plurality of thumbnail images;
wherein, in a case where the preset information that corresponds to the preset includes information relating to a first setting for an angle of view of the camera, a first icon image indicating that the information relating to the first setting is included in the preset information and the thumbnail image which corresponds to the preset are displayed, and
wherein, in a case where the preset information that corresponds to the preset includes information relating to a second setting for an image quality, a second icon image indicating that the information relating to the second setting is included in the preset information and the thumbnail image which corresponds to the preset are displayed.

2. The information processing apparatus according to claim 1, wherein the at least one processor or circuit is further configured to:
specify a thumbnail image corresponding to the preset information including the information relating to the first setting from among the plurality of thumbnail images, and determine, based on the specified thumbnail image, an arrangement of the plurality of thumbnail images that are displayed.

3. The information processing apparatus according to claim 1, wherein, in a case where the present information does not include the information relating to the first setting, a third icon image indicating that the information relating to the first setting is not included in the preset information and the thumbnail image corresponding to the preset information are displayed.

4. The information processing apparatus according to claim 1, wherein
the at least one processor or circuit is further configured to: specify a thumbnail image corresponding to the preset information including the information relating to the second setting from among the plurality of thumbnail images, and determine, based on the specified thumbnail image, an arrangement of the plurality of thumbnail images that are displayed.

5. The information processing apparatus according to claim 1, wherein, in a case where the preset information does not include the information relating to the second setting,
a fourth icon image indicating that the information relating to the second setting is not included in the preset information and the thumbnail image corresponding to the preset information are displayed.

6. The information processing apparatus according to claim 1,
wherein the at least one processor or circuit is further configured to specify a thumbnail image corresponding to the preset information including the information relating to the first setting from among the plurality of thumbnail images, and
wherein only the specified thumbnail image is displayed.

7. The information processing apparatus according to claim 1,
wherein the at least one processor or circuit is further configured to specify a thumbnail image corresponding to the preset information including the information relating to the second setting from among the plurality of thumbnail images, and
wherein only the specified thumbnail image is displayed.

8. The information processing apparatus according to claim 1,
wherein, in a case where the preset information corresponding to the preset does not include the information relating to the first setting, the first icon image is not displayed.

9. The information processing apparatus according to claim 1, wherein, in a case where the preset information corresponding to the preset does not include the information relating to the second setting, the second icon image is not displayed.

10. The information processing apparatus according to claim 1, wherein the first icon image indicates that the preset information includes information on at least one of a pan setting, a tilt setting, and a zoom setting of the camera.

11. The information processing apparatus according to claim 1, wherein the second icon image indicates that the preset information includes information on at least one of a setting for exposure, a setting for white balance, a setting for noise reduction, a setting for blur correction, and a setting for sharpness.

12. The information processing apparatus according to claim 1, wherein a display position of the first icon image and a display position of the second icon image are relatively fixed with respect to a position of the thumbnail image.

13. The information processing apparatus according to claim 1, wherein a display position of the first icon image is relatively the same position with respect to a position of the thumbnail image irrespective of presence or absence of the displaying the second icon image.

14. The information processing apparatus according to claim 1, wherein a display position of the second icon image is relatively the same position with respect to a position of the thumbnail image irrespective of presence or absence of the displaying the first icon image.

15. An information processing method comprising:

acquiring preset information including information that identifies a preset of a camera;

acquiring at least a thumbnail image which corresponds to the preset;

controlling a display device to display a plurality of thumbnail images; and displaying, in a case where the preset information that corresponds to the preset includes information relating to a first setting for an angle of view of the camera, a first icon image indicating that the information relating to the first setting is included in the preset information and the thumbnail image which corresponds to the preset, and in a case where the preset information that corresponds to the preset includes information relating to a second setting for an image quality, a second icon image indicating that the information relating to the second setting is included in the preset information and the thumbnail image which corresponds to the preset.

16. A non-transitory computer-readable storage medium configured to store a computer program comprising instructions for executing following processes:

acquiring preset information including information that identifies a preset of a camera;

acquiring at least a thumbnail image which corresponds to the preset;

controlling a display device to display a plurality of thumbnail images; and displaying, in a case where the preset information that corresponds to the preset includes information relating to a first setting for an angle of view of the camera, a first icon image indicating that the information relating to the first setting is included in the preset information and the thumbnail image which corresponds to the preset, and in a case where the preset information that corresponds to the preset includes information relating to a second setting for an image quality, a second icon image indicating that the information relating to the second setting is included in the preset information and the thumbnail image which corresponds to the preset.

* * * * *